(12) United States Patent
Wetherill et al.

(10) Patent No.: US 10,119,537 B2
(45) Date of Patent: *Nov. 6, 2018

(54) PUMP MONITORING DEVICE

(71) Applicant: Hydrotech, Inc., Cincinnati, OH (US)

(72) Inventors: Rex A. Wetherill, Cincinnati, OH (US); John Rasmussen, Youngstown, OH (US); Peter R. Jones, Loveland, OH (US)

(73) Assignee: IOT Diagnostics LLC, Cincinnati, OH (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/052,414

(22) Filed: Feb. 24, 2016

(65) Prior Publication Data

US 2016/0252087 A1    Sep. 1, 2016

Related U.S. Application Data

(63) Continuation of application No. 14/849,727, filed on Sep. 10, 2015, now Pat. No. 9,275,536, which is a
(Continued)

(51) Int. Cl.
*G08B 21/00* (2006.01)
*G08B 17/10* (2006.01)
(Continued)

(52) U.S. Cl.
CPC .............. *F04B 51/00* (2013.01); *F04B 49/06* (2013.01); *F04B 49/10* (2013.01);
(Continued)

(58) Field of Classification Search
CPC .................................................. G08B 13/2417
See application file for complete search history.

(56) References Cited

U.S. PATENT DOCUMENTS

| 4,173,144 A | 11/1979 | Pounder |
| 4,515,022 A | 5/1985 | Brand |

(Continued)

FOREIGN PATENT DOCUMENTS

| EP | 1069312 A1 | 1/2001 |
| WO | 0227276 A2 | 4/2002 |

OTHER PUBLICATIONS

Impact Technologies, LLC, Product brochure for Hydraulic Pump Life Monitor, 2010.

(Continued)

*Primary Examiner* — Joseph Feild
*Assistant Examiner* — Pameshanand Mahase
(74) *Attorney, Agent, or Firm* — Wood Herron & Evans LLP

(57) ABSTRACT

A pump monitoring device is configured to be connected to a case drain of a pump. The device includes a manifold having an inlet for connection to the case drain. A flow rate sensor generates a signal indicative of a flow rate of fluid in a fluid path. The flow rate sensor includes a temperature sensor, a heater, and a sensor barrel. The heater heats the sensor barrel while in fluid communication with the fluid. A pressure sensor generates a signal indicative of a pressure of the fluid.

14 Claims, 13 Drawing Sheets

Related U.S. Application Data continuation of application No. 13/660,579, filed on Oct. 25, 2012, now Pat. No. 9,140,255.

(60) Provisional application No. 61/551,334, filed on Oct. 25, 2011.

(51) Int. Cl.

| | | |
|---|---|---|
| *B05B 3/02* | (2006.01) | |
| *B05B 3/00* | (2006.01) | |
| *E03B 7/07* | (2006.01) | |
| *F17D 3/00* | (2006.01) | |
| *F04B 51/00* | (2006.01) | |
| *F04B 49/06* | (2006.01) | |
| *F04B 49/10* | (2006.01) | |
| *G01F 1/06* | (2006.01) | |
| *F04D 15/00* | (2006.01) | |
| *G01K 13/02* | (2006.01) | |
| *G01F 1/69* | (2006.01) | |
| *G01F 15/06* | (2006.01) | |
| *G01L 19/12* | (2006.01) | |
| *G08B 21/18* | (2006.01) | |
| *G01F 1/34* | (2006.01) | |
| *G01F 15/14* | (2006.01) | |

(52) U.S. Cl.
CPC ........... *F04D 15/0088* (2013.01); *G01F 1/06* (2013.01); *G01F 1/34* (2013.01); *G01F 1/69* (2013.01); *G01F 15/06* (2013.01); *G01F 15/14* (2013.01); *G01K 13/02* (2013.01); *G01L 19/12* (2013.01); *G08B 21/187* (2013.01); *F04B 2201/0405* (2013.01); *F04B 2207/701* (2013.01); *F04B 2207/702* (2013.01); *G01K 2013/026* (2013.01)

(56) References Cited

U.S. PATENT DOCUMENTS

| | | | |
|---|---|---|---|
| 5,062,442 A | 11/1991 | Stenstrom et al. | |
| 5,157,935 A | 10/1992 | Gregory | |
| 5,563,351 A | 10/1996 | Miller | |
| 5,628,229 A * | 5/1997 | Krone | F04B 49/065 702/130 |
| 6,119,528 A | 9/2000 | Genack | |
| 6,260,004 B1 | 7/2001 | Hays et al. | |
| 6,297,626 B1 | 10/2001 | Boston et al. | |
| 6,330,525 B1 * | 12/2001 | Hays | G05B 23/0235 376/245 |
| 6,829,542 B1 | 12/2004 | Reynolds et al. | |
| 7,097,351 B2 | 8/2006 | Lancon et al. | |
| 7,124,057 B2 | 10/2006 | Forster et al. | |
| 7,204,138 B2 | 4/2007 | Du | |
| 7,239,155 B2 | 7/2007 | Byington et al. | |
| 7,504,835 B2 | 3/2009 | Byington et al. | |
| 2001/0026225 A1 * | 10/2001 | Young | G01F 1/363 340/606 |
| 2006/0027267 A1 * | 2/2006 | Fritze | F17D 5/02 137/487.5 |
| 2006/0162439 A1 * | 7/2006 | Du | F15B 19/005 73/168 |
| 2006/0168611 A1 * | 7/2006 | Fima | E03B 1/00 725/10 |
| 2010/0162810 A1 * | 7/2010 | Hasebe | G01F 1/6845 73/204.26 |
| 2010/0223991 A1 | 9/2010 | Muraoka et al. | |
| 2010/0301123 A1 * | 12/2010 | Dorendorf | E03D 9/04 236/49.3 |
| 2011/0056192 A1 | 3/2011 | Weber et al. | |
| 2011/0056194 A1 | 3/2011 | Wojcicki et al. | |
| 2011/0162447 A1 | 7/2011 | Kirk et al. | |
| 2012/0167594 A1 | 7/2012 | Poisson et al. | |
| 2013/0099931 A1 | 4/2013 | Wetherill et al. | |
| 2014/0099212 A1 | 4/2014 | Dybing et al. | |

OTHER PUBLICATIONS

Webster Instruments, Product brochure for FlowHUB Series monitor, (Issue 2), Jan. 2011.

Impact Technologies, LLC, Short Company Overview and Pump/Actuator PHM Experience, 2008.

European Patent Office, International Search Report and Written Opinion of the International Searching Authority, International Application No. PCT/US2012/061921, dated Feb. 19, 2013 (18 pages).

European Patent Office, International Search Report and Written Opinion of the International Searching Authority, International Application No. PCT/US2017/060149, dated Feb. 13, 2018 (12 pages).

* cited by examiner

PUMP MONITORING DEVICE

CROSS-REFERENCE TO RELATED APPLICATIONS

The present application is a continuation application of U.S. Ser. No. 14/849,727, filed Sep. 10, 2015, which is a continuation application of U.S. Ser. No. 13/660,579, filed Oct. 25, 2012, now U.S. Pat. No. 9,140,255, issued on Sep. 22, 2015, which claims the filing benefit of U.S. Provisional Patent Application Ser. No. 61/551,334, filed Oct. 25, 2011, each disclosure of which is incorporated herein by reference in its entirety.

FIELD OF THE INVENTION

This invention relates generally to fluid circuits and, more particularly, to a device for monitoring the operating condition of a pump in the fluid circuit.

BACKGROUND OF THE INVENTION

Industrial systems oftentimes utilize fluid power systems to perform work, such as, to run hydraulic motors or to extend and retract cylinders in various manufacturing or production environments, for example. These fluid power systems include fluid pumps that are used to pressurize fluid, proportionate to a resistive load, such as hydraulic fluid, in the system. To pressurize the fluid, the pumps have rotating components that gradually wear over time and may eventually fail if the wear is left unchecked.

Failure of the pump can have catastrophic consequences. For example, if a pump abruptly fails, substantial debris can be introduced into the system causing damage to downstream components. In addition, catastrophic failures can result in substantial disruption of the manufacturing process. In view of the consequences of pump failure, it is desirable to perform periodic preventive maintenance of fluid power systems. During preventive maintenance, mechanics can replace worn pumps before they fail catastrophically, thus avoiding damage to other components or a major disruption in production.

One problem, however, is how to objectively schedule preventive maintenance. Generally, preventive maintenance schedules are developed from past experience and are subjective. Because pump wear cannot be easily monitored during operation, failures may not be easily predicted. In this regard, fluid pumps, and specifically piston pumps and piston motors, have an external case drain from which fluid leaks during operation based on designed leakage rates to provide hydrostatic balance of the pistons. This is accomplished by an orifice from the front of the piston (pressure side) to the balancing shoe, which has an area equal to the front or pressure side of the pistons. Fluid leakage from the case drain may be due to increased leakage within the pump around and between various components and seals in the pump. As any one or more of the components wears, the fluid exiting the case drain may increase. By sensing the flow of fluid through a case drain, an estimate of the remaining pump life may be made. In situations where the fluid exiting the case drain reaches a predetermined volume, preventive maintenance may be scheduled.

Prior art devices for measuring leakage from a case drain, however, are generally complicated in design and may be costly. One known device is disclosed in U.S. Pat. No. 5,563,351. However, the disclosed device is a complicated venturi design which requires sophisticated analysis techniques and may be difficult to calibrate. Furthermore, the disclosed design fails to provide any measurement of other parameters of the fluid power system at the case drain. Rather, other parameters, for example, temperature and pressure, are measured at the pump, which requires additional wiring and connectivity to the device. For this reason, such measurements are costly or may not be taken at all. In view of this deficiency, the information needed to predict an impending pump failure may be missing.

It would be desirable, accordingly, to provide devices that address these and other problems associated with conventional devices designed for such purpose.

SUMMARY OF THE INVENTION

The present invention overcomes the foregoing and other shortcomings and drawbacks of known pump monitoring devices for use in fluid circuits. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a pump monitoring device is configured to be connected to a case drain of a pump. According to one aspect of the present invention, the device includes a manifold including an inlet configured for fluid connection to the case drain and an outlet. A fluid path extends between the inlet and the outlet.

A flow rate sensor is operatively connected to the manifold and is configured to generate a signal indicative of a flow rate of a fluid flowing in the fluid path from the inlet to the outlet.

A temperature sensor is operatively connected to the manifold and is configured to generate a signal indicative of a temperature of the fluid flowing in the flow path.

A pressure sensor is operatively connected to the manifold and is configured to generate a signal indicative of a pressure of the fluid flowing in the flow path.

There is at least one fault indicator operatively coupled to at least one of the flow rate sensor, the temperature sensor, and the pressure sensor. The fault indicator is configured to provide a human perceptible indication that at least one of a sensed flow rate, a sensed temperature, or a sensed pressure of the fluid flowing in the fluid path exceeds a predetermined threshold value.

According to another aspect of the present invention, the device includes a flow rate sensor. The flow rate sensor includes a temperature sensor, a heater, and a sensor barrel. The sensor barrel is in fluid communication with the fluid path. The heater and the temperature sensor are in thermal communication with the sensor barrel. The heater is configured to heat the sensor barrel, and the temperature sensor is configured to generate at least one signal indicative of a temperature of the sensor barrel. The temperature sensor is also configured to generate a signal indicative of a temperature of the fluid flowing in the fluid path when the sensor barrel is not being heated by the heater.

There is at least one fault indicator operatively coupled to at least one of the flow rate sensor and the temperature sensor. The fault indicator is configured to provide a human perceptible indication that at least one of a sensed flow rate or a sensed temperature of the fluid flowing in the fluid path exceeds a predetermined threshold value.

The above and other objectives and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiments given below, serve to explain the principles of the invention.

DETAILED DESCRIPTION OF THE INVENTION

Figure 1:
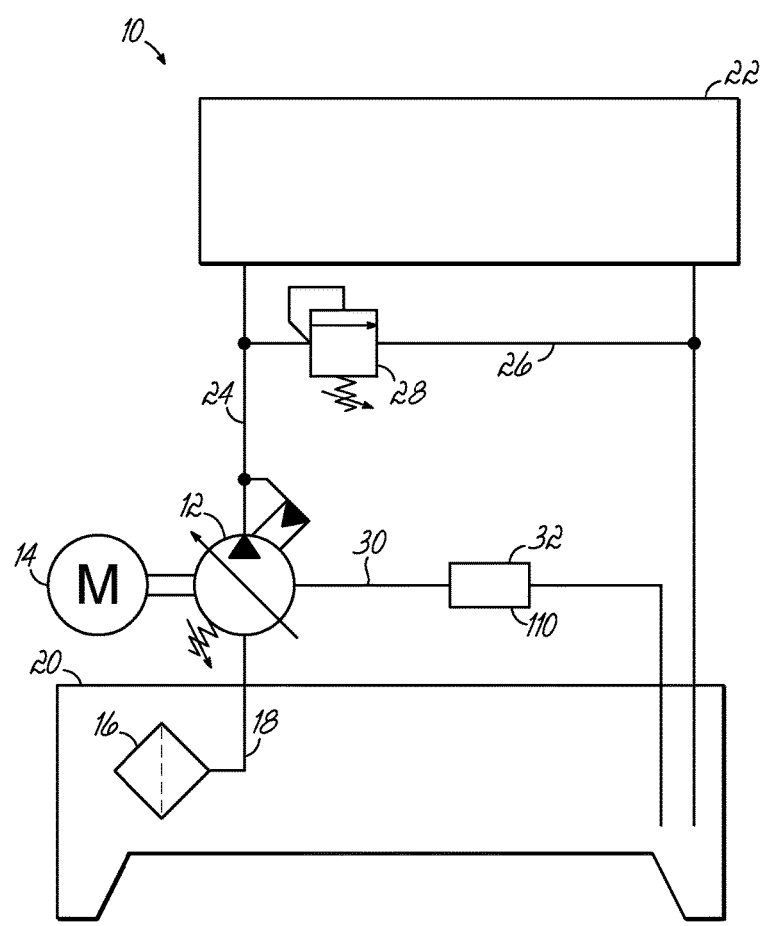
FIG. 1 is a schematic view of a fluid power system according to one embodiment of the invention.

With reference to FIG. 1, an exemplary fluid power system 10 may include a variable speed hydraulic pump 12 powered by a motor 14. During operation, the pump 12 may draw fluid through a filter 16 and suction line 18 from a tank 20. The pump 12 may pressurize the fluid for use by a machine 22 in fluid communication with the pump 12 via a main line 24. The system 10 may optionally include other circuits, such as, the pressure relief circuit 26, including a relief valve 28 for relieving pressure in the system 10 in the event of a malfunction of the pump 12 or machine 22. The pump 12 may also include a case drain 30, which may drain any leakage of the fluid through the pump 12 back to the tank 20. While some fluid leakage through the case drain 30 may be normal, the flow through the case drain 30 may increase as the pump 12 wears during use.

In this regard, and in one embodiment of the invention, a pump monitoring device 32 is connected to the case drain 30 to measure the flow rate, temperature, and pressure of the fluid passing from the pump 12 back to the tank 20 through the case drain 30. The device 32 is configured to monitor each of the flow rate, temperature, and pressure and to provide a human perceptible indication when at least one of these measurements is equal to or greater than a predetermined threshold value that is deemed acceptable for the pump 12.

For example, the device 32 measures the flow rate of the fluid from the case drain 30. If the measured flow rate meets or exceeds a predetermined threshold value for the flow rate, the device 32 may provide a visual indication, for example, activation of a light, that the measured flow rate meets or exceeds the predetermined threshold value. By this measurement and indication, the device 32 is configured to notify an operator or mechanic, or the like, that the pump 12 may require maintenance to avoid failure. In other words, the device 32 may provide an alarm when one of the measured parameters becomes abnormal and thus the device 32 may provide an opportunity to avoid catastrophic failure of the pump 12.

To that end, with reference to FIGS. 2 and 3, in one embodiment, the pump monitoring device 32 includes a manifold 34 secured to a housing 36, each described in detail below. The device 32 may further include a gasket 40 sandwiched between the manifold 34 and the housing 36. The gasket 40 may be configured to prevent ingress and egress of fluid between the manifold 34 and the housing 36. Furthermore, as shown in FIG. 3, an o-ring seal 42 may be disposed in a groove 44 so as to prohibit leakage of fluid between the manifold 34 and the housing 36.

Figure 3:
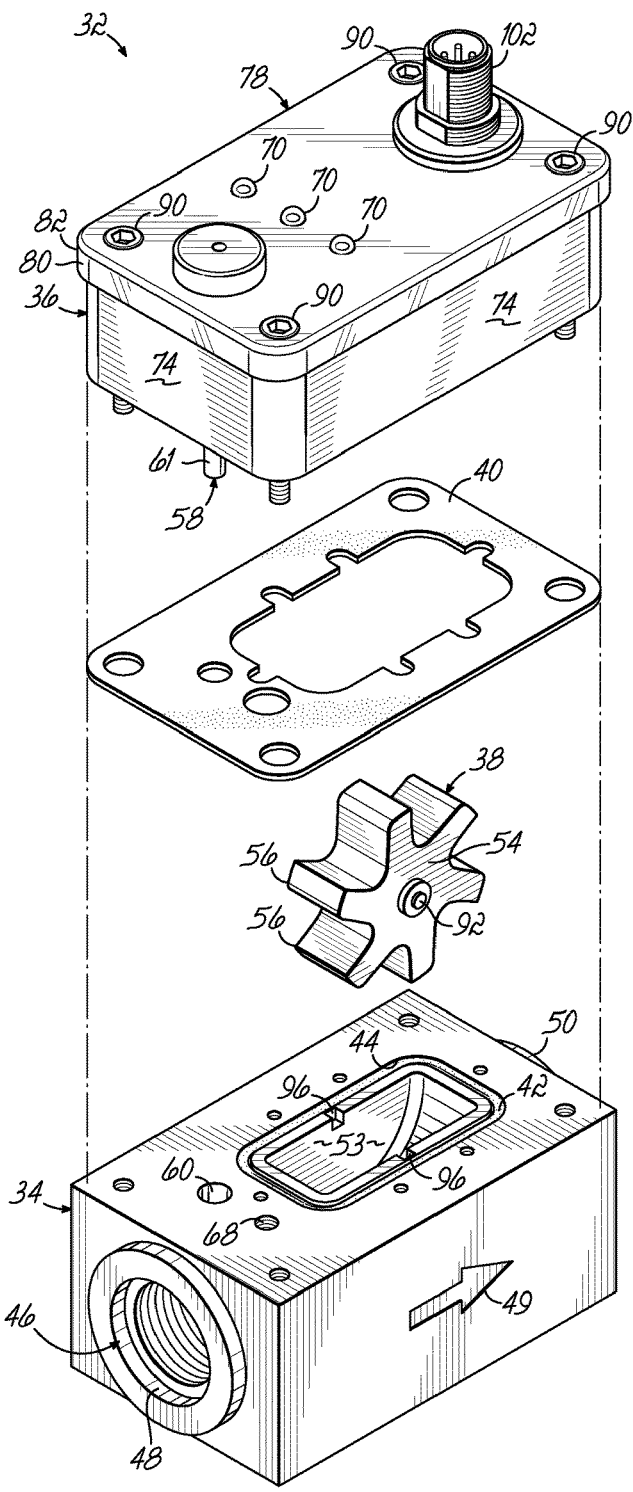
FIG. 3 is an exploded perspective view of the pump monitoring device of FIG. 2, illustrating a housing, a gasket, a flow sensor, and a manifold.
Figure 4:
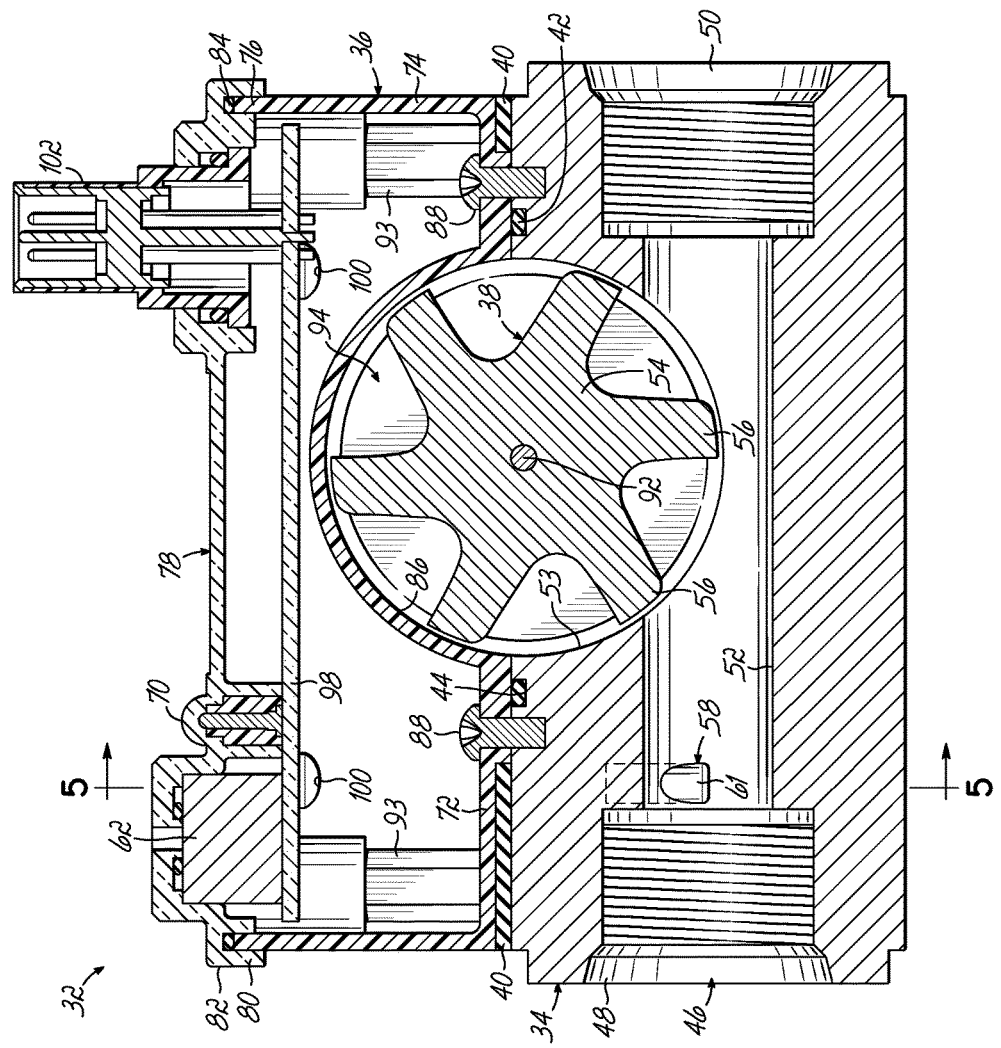
FIG. 4 is a cross-sectional view of the device of FIG. 2 taken along section line 4-4 of FIG. 2.
Figure 5:
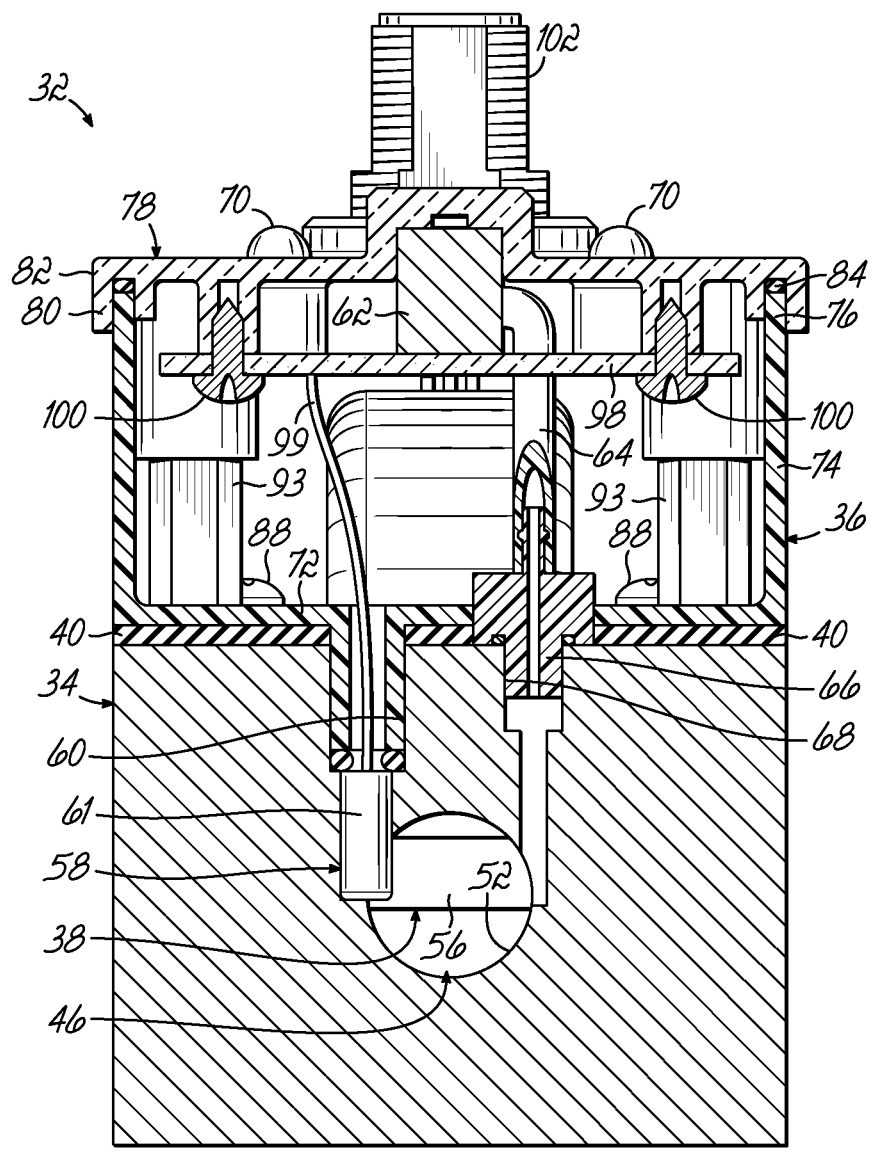
FIG. 5 is a cross-sectional view of the device of FIG. 4 taken along section line 5-5 of FIG. 4.
Figure 7:
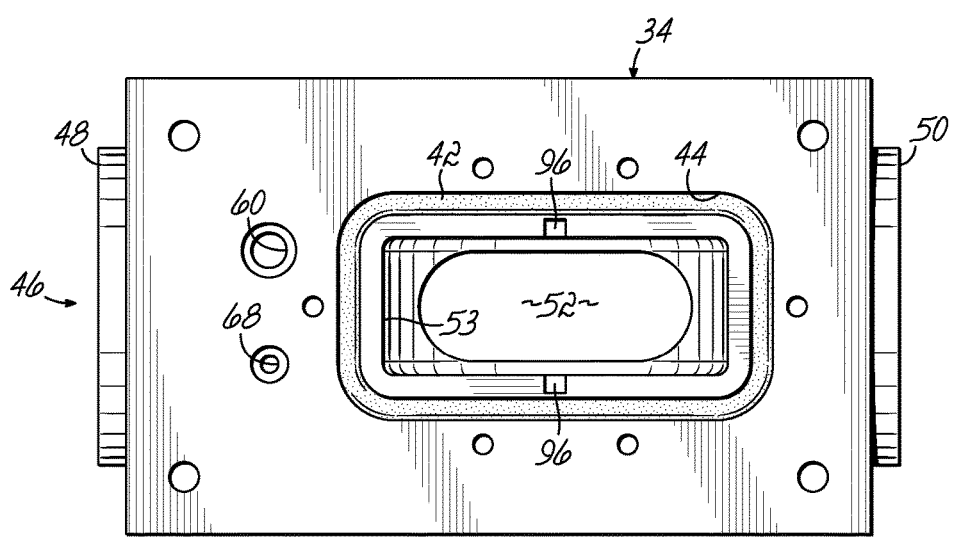
FIG. 7 is a top plan view of the manifold shown in FIG. 3.

With reference to FIGS. 4, 5, and 7, in one embodiment, the manifold 34 defines a fluid path 46 including an inlet 48 configured for fluid connection to the case drain 30 and an outlet 50 that may drain to the tank 20 by a drain line. As such, fluid leaking from the pump 12 shown in FIG. 1 and passing through the case drain 30 may flow through the inlet 48 and out of the outlet 50 in the direction indicated by the arrow 49 in FIGS. 2 and 3. As shown, the inlet 48 and outlet 50 may be female threaded connections and may, therefore, each be configured to receive a male threaded connection. However, it will be appreciated that the inlet 48 and the outlet 50 may include other means for connection to the case drain 30. By way of example and not limitation, the inlet 48 and/or outlet 50 may be sized from about 9/16-18 unf to about 15/16 unf and may depend on the flow rate expected through the device 32. In one exemplary embodiment, a bore 52 defines the fluid path 46 and fluidly connects the inlet 48 to the outlet 50. However, it will be appreciated that the fluid path 46 may have other cross-sectional configurations. In one embodiment, the pressure drop from inlet 48 to the outlet 50 may not exceed 1 psi at 10 GPM.

In one embodiment, the flow rate sensor 38 is operatively connected to the manifold 34 and is configured to generate a signal when fluid flows through the fluid path 46 from the inlet 48 to the outlet 50. By way of example and not limitation, the flow rate sensor 38 may be in fluid communication with the fluid path 46. As will be described in more detail below, the manifold 34 may define a flow sensor chamber 53, shown best in FIGS. 4 and 7. In the embodiment shown, the flow rate sensor 38 is a rotatable paddle wheel 54 including a plurality of paddles 56 that is partially housed in the flow sensor chamber 53. Thus, when fluid flows from the inlet 48 to the outlet 50, the fluid contacts the paddles 56 and rotates the paddle wheel 54. The signal is generated from rotation of the paddle wheel 54. In particular, the paddle wheel 54, or more particularly a part thereof, may be magnetized such that a solid state magnetism sensor (not shown) positioned proximate the paddle wheel 54 may sense the rotation of the paddle wheel 54. For example, the rotation of the paddle wheel 54 may produce pulses in the sensor, the frequency of the pulses being associated with the flow rate as will be understood by those of ordinary skill in the art. The fluid flow through the fluid path 46 may depend on the size of the pump 12 and the cross-sectional size of the fluid path 46. In this regard, the flow rate sensor 38 may measure flows in the range of from about 0.4 GPM to about 15 GPM depending on the size of the pump 12. As is described in more detail below, in one embodiment, the flow rate sensor 38 may be located and secured between the manifold 34 and the housing 36.

With reference to FIG. 5, in one embodiment, the pump monitoring device 32 includes a temperature sensor 58 operatively connected to the manifold 34 and configured to generate a signal indicative of a temperature of the fluid flowing in the fluid path 46. In one embodiment, the temperature sensor 58 is a thermistor which outputs a signal representative of the temperature of the fluid. By way of example, the temperature sensor 58 may be disposed in a bore 60 in the manifold 34. As shown, the bore 60 may intersect the fluid path 46, though embodiments of the invention are not so limited. It will be appreciated that the temperature of the fluid may be measured without direct contact between the temperature sensor 58 and the fluid. For example, the fluid may contact a stainless steel shell 61 residing in the bore 60, the temperature sensor 58 measuring the temperature of the stainless steel shell 61 as being representative of the temperature of fluid. By way of example and not limitation, the temperature sensor 58 may be configured to measure temperatures in a range from about 32° F. to about 200° F. Temperature sensors according to embodiments of the invention are commercially available from Cantherm, Montreal, Canada, under part number MFS2C1103F3380. In one embodiment, the temperature sensor 58 is positioned upstream from the flow rate sensor 38.

With continued reference to FIG. 5, in one embodiment, the pump monitoring device 32 includes a pressure sensor 62 operatively connected to the manifold 34. By way of example, the pressure sensor 62 is connected via a tube 64 to a fitting 66 disposed in a bore 68 in the manifold 34. By way of example only, the pressure sensor 62 may be a solid state pressure sensor, such as, a silicone sealed piezoelectric. The pressure sensor 62 may monitor the pressure of the fluid in the fluid path 46 and generate a signal representative of that pressure. The pressure sensor 62 may be configured to measure pressure of the fluid in a range of from about 0 psi to about 100 psi, and by way of further example, in a range of from about 0 psi to about 50 psi. Pressure sensors according to embodiments of the invention are commercially available from Sensormate Enterprise, Chang Hua, Taiwan under part number 33A-050G-1230. In one embodiment, the pressure sensor 62 may be positioned upstream from the flow rate sensor 38.

With reference to FIG. 4, in one embodiment, the device 32 includes at least one fault indicator 70. The fault indicator 70 is operatively connected to the flow rate sensor 38, the temperature sensor 58, and the pressure sensor 62. By this connection, when one of the signals from any single one of the flow rate sensor 38, the temperature sensor 58, or the pressure sensor 62 exceeds a predetermined threshold value for that signal, the device 32 may provide a human perceptible indication via the fault indicator 70 that one of the signals exceeds the predetermined value. For example, the indication may be in response to the temperature signal meeting or exceeding a predetermined temperature value, may be in response to the pressure signal meeting or exceeding a predetermined pressure value, or may be in response to the flow rate meeting or exceeding a predetermined flow rate value. By way of example, the fault indicator 70 may be a light, such as, an LED, which switches to the "on" or lit condition when one of the signals meets or exceeds the predetermined value for the corresponding value. However, other human perceptible indications may include a visual, colored pop-up or a sound. Thus, the pump monitoring device 32 provides an alarm or warning which is localized to the area surrounding the pump 12. In an alternative embodiment, it will be understood that the fault indication may be transmitted to a remote location, such as by wire or wireless transmission.

Figure 6:
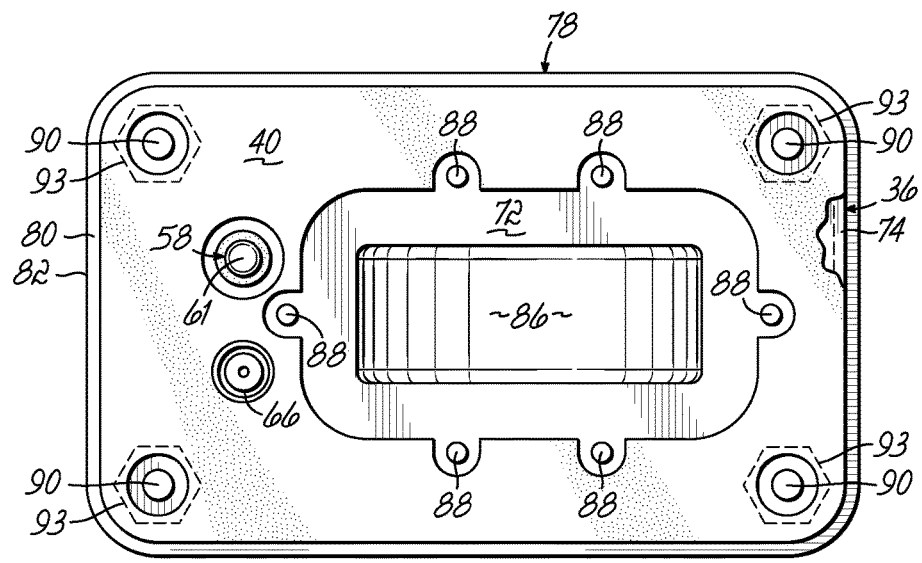
FIG. 6 is a bottom plan view of the housing shown in FIG. 3.

With reference to FIGS. 4, 5, and 6, in one embodiment, the housing 36 may include a bottom wall 72 with an upstanding side wall 74 projecting from the bottom wall 72 and defining a rim 76. A cover or lid 78 may be configured to capture the rim 76 in a U-shaped trough 80 that defines a perimeter 82 of the lid 78. An o-ring 84 may be disposed in the U-shaped trough 80 and form a seal with the lid 78 when the lid 78 is secured thereto. The housing 36 may be secured to the manifold 34 along the bottom wall 72 with, for example, screws 88. The lid 78 may be secured to the housing 36 and the manifold 34 via screws 90 (FIG. 2) and supports 93.

With continued reference to FIGS. 4, 5, and 6, in one embodiment, the bottom wall 72 may be shaped to form a flow sensor chamber 86 in the housing 36. Accordingly, in this embodiment, the flow sensor chamber 53 in the manifold 34 and the flow sensor chamber 86 in the housing 36 provide an enlarged chamber 94 when the manifold 34 is secured to the housing 36, as is best shown in FIG. 4. As shown, the chamber 94 is in fluid communication with the fluid path 46, and the paddle wheel 54 is rotatably disposed in the chamber 94 on a pin or dowel 92 engaged in recesses 96 (shown in FIGS. 3 and 7) formed in the manifold 34. As set forth above, rotation of the paddle wheel 54 by fluid flowing through the fluid path 46 produces a signal representative of the flow rate of fluid through the case drain 30.

As shown best in FIGS. 4 and 5, in one embodiment, the housing 36 and lid 78 contain a circuit board 98. As shown, the circuit board 98 may be secured to the lid 78 by screws 100. Each of the sensors 38, 58, and 62 may be electrically or otherwise operatively coupled to the circuit board 98. For example, the temperature sensor 58 may be coupled to the circuit board 98 via an electrical lead or wire 99. Signals from each of the sensors 38, 58, and 62 may then be processed by components mounted to the circuit board 98 in a conventional manner known to those skilled in the art. In this regard, the circuit board 98 may include a processor (not shown) and a memory (not shown) in which predetermined threshold values for the flow rate, the temperature, and the pressure of the fluid may be stored for comparison to the measured values of the flow rate, the temperature, and the pressure as represented by the signals from each of the sensors 38, 58, and 62. In addition, in one embodiment, the fault indicator 70 may reside on the circuit board 98. In one embodiment, a plurality of fault indicators 70, one for each of the flow rate sensor 38, the temperature sensor 58, and the pressure sensor 62 are disposed on the circuit board 98 and are visible to passersby through the lid 78.

Figure 2:
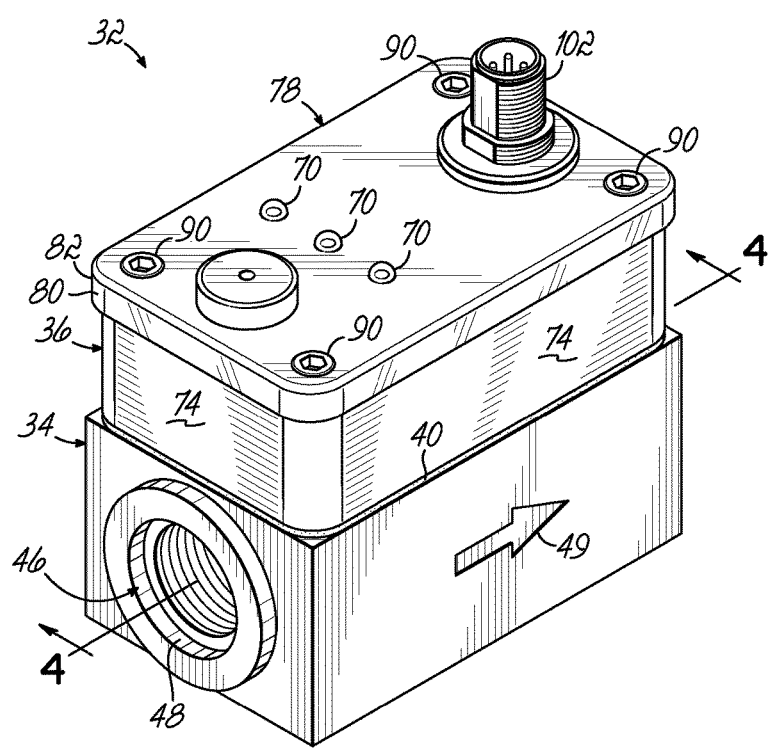
FIG. 2 is a perspective view of a pump monitoring device according to one embodiment of the invention.

In one embodiment, and with reference to FIGS. 2 and 3, the pump monitoring device 32 may include an optional power port 102 for connecting the circuit board 98 to an external source of electricity. However, it will be appreciated that the device 32 may be battery powered or obtain electrical power through other means in which case the port 102 would not be required. It will be further appreciated that the device 32 may include other data ports capable of transmitting any of the flow rate, temperature, and/or pressure signals to a remote location.

Figure 8:
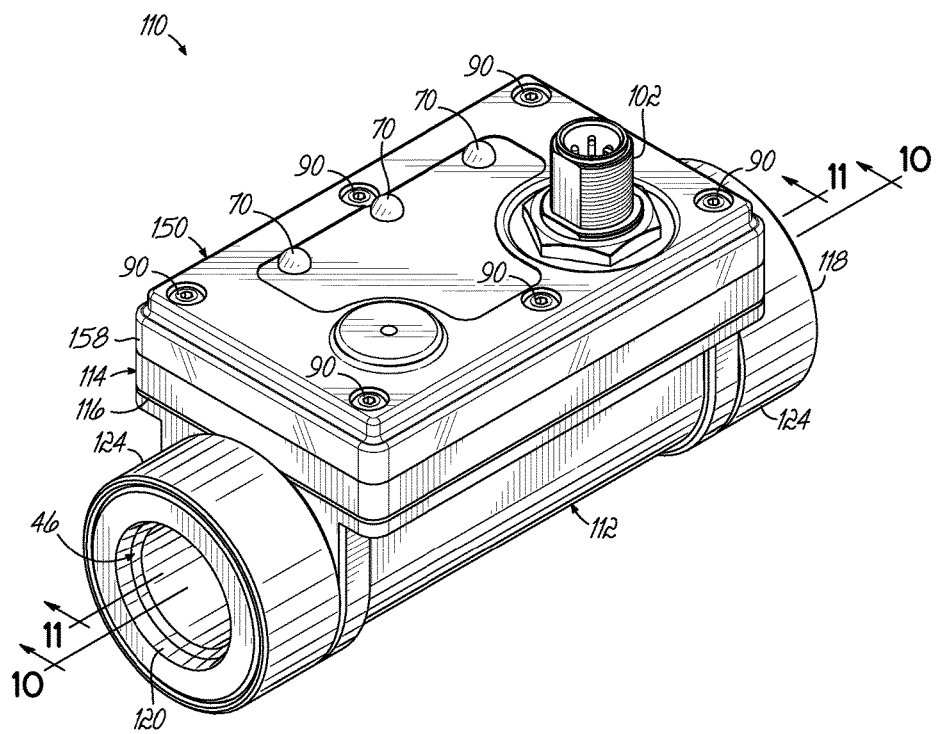
FIG. 8 is a perspective view of a pump monitoring device according to one embodiment of the invention.
Figure 9:
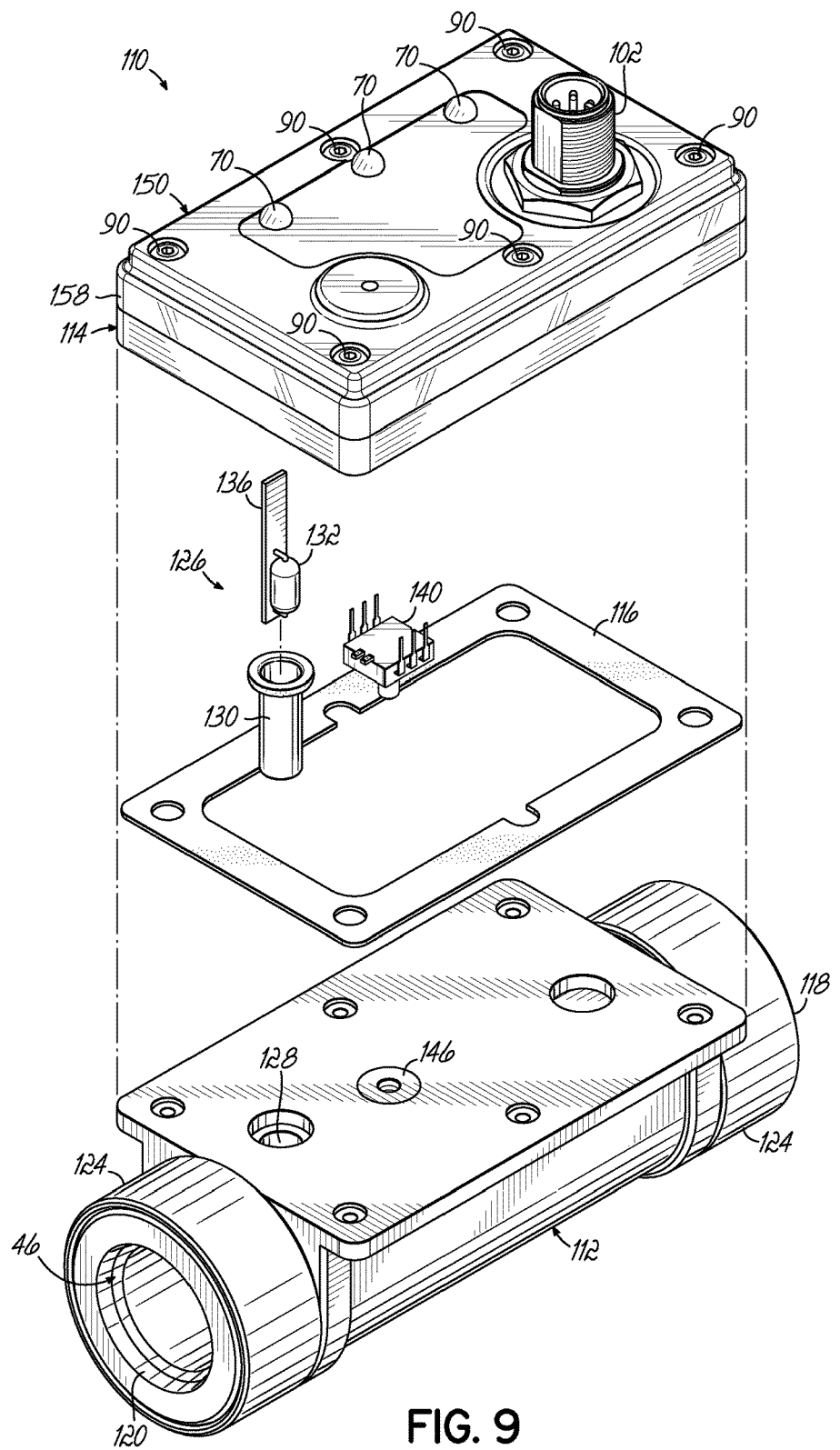
FIG. 9 is an exploded perspective view of the pump monitoring device of FIG. 8, illustrating a housing, a gasket, a sensor assembly, and a manifold.

With reference to FIGS. 8 and 9, there is shown an alternative embodiment to the device 32 shown in FIGS. 2-7 and described above, where like numerals represent like parts. In this regard, and in one embodiment of the invention, a pump monitoring device 110 may be connected to the case drain 30, shown in FIG. 1. Similar to the device 32, as set out above, the device 110 is configured to monitor any single one or each of the fluid flow rate, fluid temperature, and fluid pressure and provide human perceptible indication when at least one of these measurements meets or exceeds a predetermined threshold value that is deemed acceptable for the pump 12.

Figure 10:
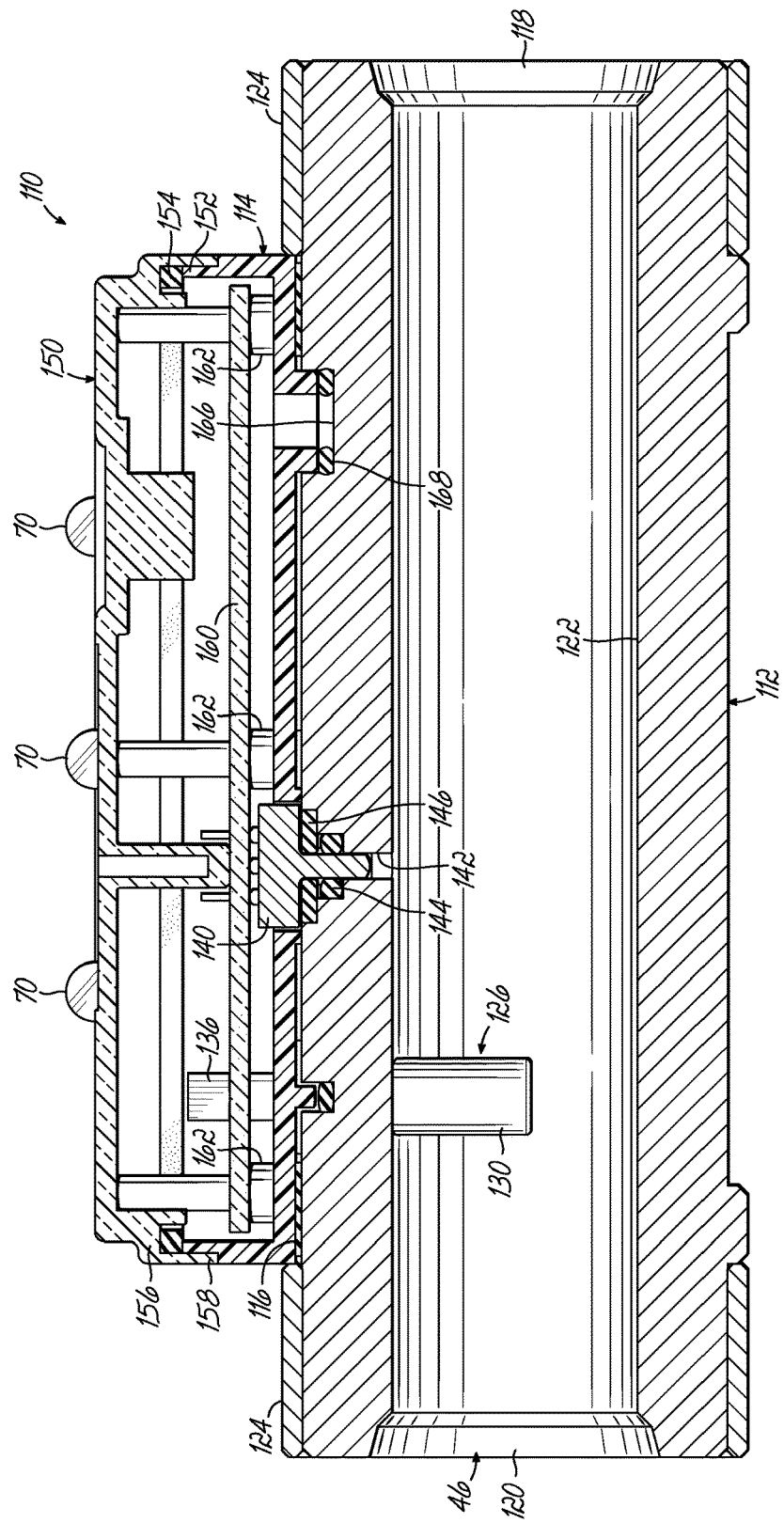
FIG. 10 is a cross-sectional view of the device of FIG. 8 taken along section line 10-10 of FIG. 8.

To that end, in one embodiment, the pump monitoring device 110 includes a manifold 112 secured to a housing 114. A gasket 116 may be sandwiched between the manifold 112 and the housing 114 to substantially prevent ingress or egress of fluid between the manifold 112 and the housing 114. With reference to FIGS. 8, 9, and 10, the manifold 112 defines the fluid path 46 including an inlet 118 and an outlet 120. In one exemplary embodiment of the manifold 112, a bore 122 (FIG. 10) defines the fluid path 46 and fluidly connects the inlet 118 to the outlet 120. The pump monitoring device 110 may be coupled to the case drain 30 via the inlet 118 as shown in FIG. 1. Fluid flow from the pump 12 passing through the case drain 30 enters the inlet 118 such that any one or more of the temperature, pressure, and flow rate of the fluid may be measured from the fluid flow through the pump monitoring device 110.

As shown in FIGS. 8 and 9, the manifold 112 may have a generally tubular configuration, although it will be understood that the device 110 is not limited to any particular configuration. By way of example only, the internal diameter of the inlet 118 and the outlet 120 may conform to a specific SAE specification, such as, SAE 6, 8, 10, 12, 16, or 20, so that the inlet 118 and the outlet 120 may be dimensioned and threaded to match the desired specification as described in greater detail below. In general, it will be appreciated that the size of the inlet 118 and the outlet 120 may be scaled to fit the size of the adjacent pipe or fluid conduit to which the manifold 112 is to be coupled. Further in this regard, the manifold 112 may have other configurations which may depend upon the configuration of the case drain 30 and the cost for manufacturing the pump monitoring device 110, among others. The manifold 112 may be made of a plastic or a nonmetallic material that is suitable for the fluid use in the system 10. However, the manifold 112 is not limited to being made of any particular plastic or nonmetallic material. In one embodiment, the manifold 112 is molded from a rigid polyvinyl chloride (PVC) available from PolyOne Corporation.

To couple the device 110 to the case drain 30, the manifold 112 may further include ring couplers 124 at one or both of the inlet 118 and the outlet 120. Ring couplers 124 may be moved axially relative to the fluid path 46 to engage a pipe or fluid conduit of similar diameter at each of the inlet 118 and the outlet 120. By way of example, the ring couplers 124 may be internally or externally threaded, configured to be glued, or configured to be otherwise secured to the adjacent pipe to install the pump monitoring device 110 on the drain 30.

Figure 11:
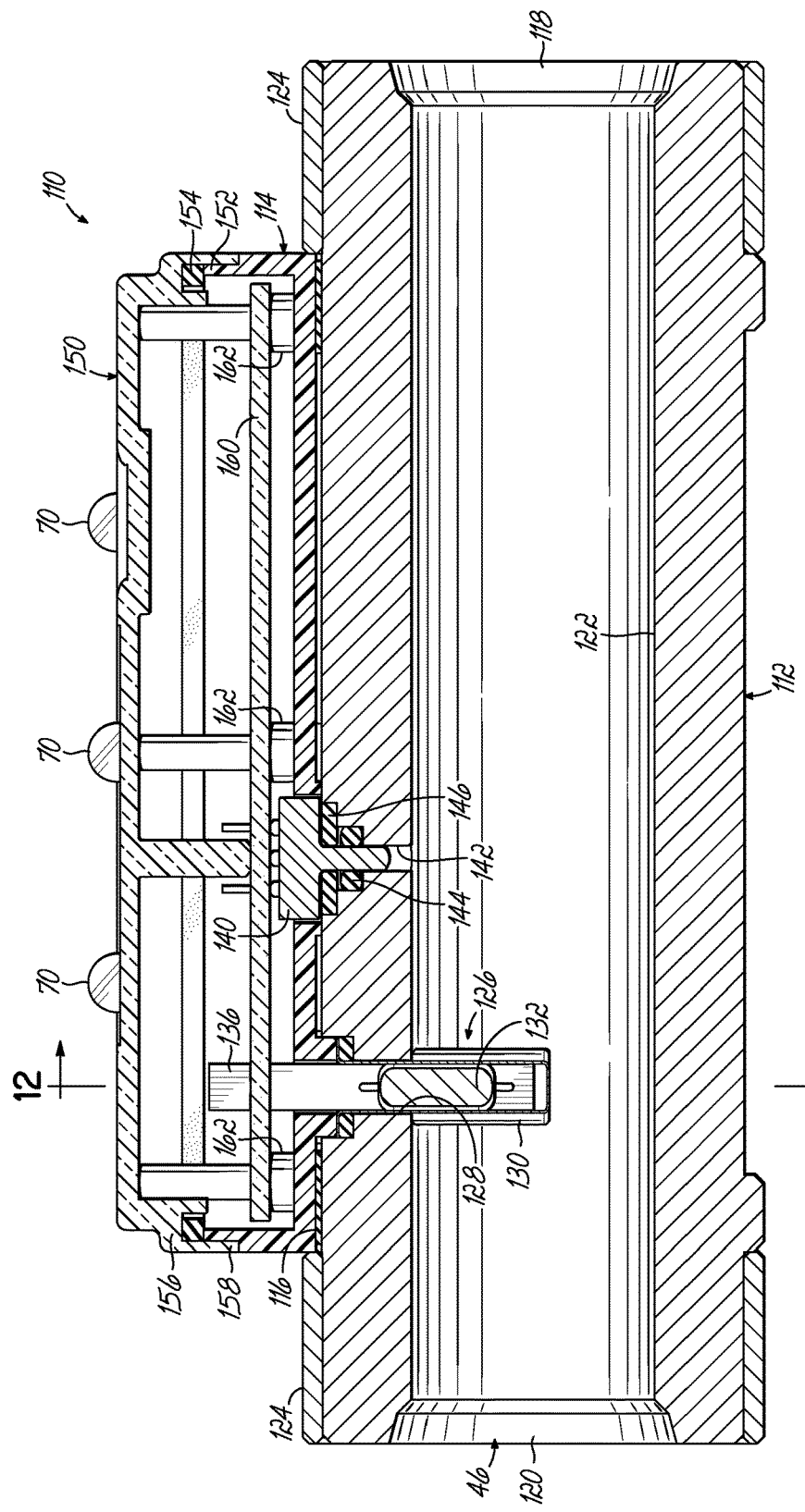
FIG. 11 is a cross-sectional view of the device of FIG. 8 taken along section line 11-11 of FIG. 8.
Figure 12:
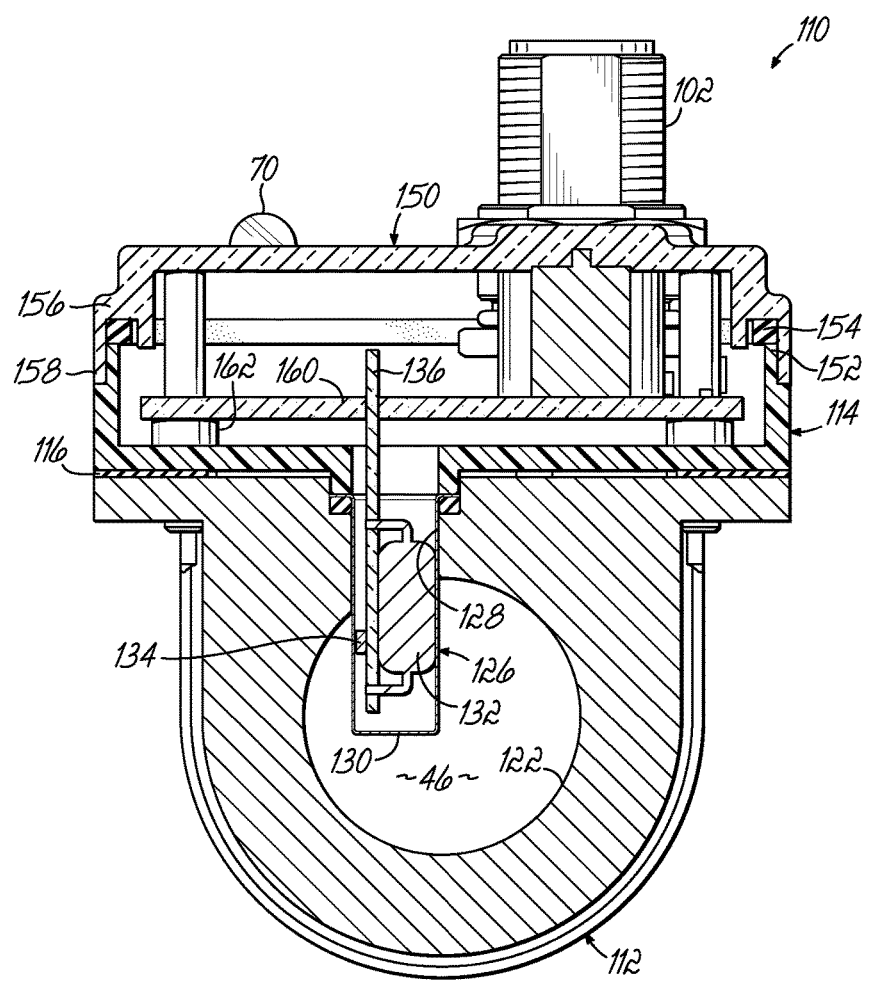
FIG. 12 is a cross-sectional view of the device of FIG. 8 taken along section line 12-12 of FIG. 11.

With reference to FIGS. 9, 11, and 12, in one embodiment and as an alternative to the flow rate sensor 38 shown and described in connection with FIG. 3, the device 110 includes a flow rate sensor 126 to measure the flow rate of the fluid passing along the fluid path 46. The flow rate sensor 126 measures the heat transfer between the flow rate sensor 126 and the fluid. The measured heat transferred is then used to calculate fluid flow through the bore 122. Without intending to be bound by theory, the quantity of heat transferred between the flow rate sensor 126 and the fluid in the bore 122 depends on the velocity of the fluid and the difference in temperature between the flow rate sensor 126 and temperature of the fluid. Thus, it will be appreciated that the higher the velocity and/or the greater the temperature difference, the greater the quantity of heat transferred between the temperature sensor 126 and the fluid.

While the flow rate sensor 126 is described in conjunction with FIGS. 9-13, it will be understood that the flow rate sensor 126 may be used in connection with the device 32 to replace the flow rate sensor 38 for measuring the fluid flow rate. In other words, the flow rate sensors 38 and 126 and any of the other sensors described herein may be used in any combination.

In one embodiment, the manifold 112 includes a bore 128. As shown, the bore 128 is generally perpendicularly oriented with respect to, and intersects, the bore 122. The flow rate sensor 126 may be disposed in the bore 128. With reference to FIGS. 9, 11, and 12, in the embodiment shown, the flow rate sensor 126 includes a sensor barrel 130 that contains a heater 132 and a temperature sensor 134 mounted on a circuit board 136. The sensor barrel 130 is exposed to the fluid passing through the bore 122. In other words, fluid comes into direct contact with the sensor barrel 130. The flow rate sensor 126 is then used to measure the heat transferred to or from the fluid. In operation, heat may flow from the sensor barrel 130 to the fluid, and the flow rate sensor 126 is configured to determine this heat flow. In other words, heat is removed from the sensor barrel 130 by fluid flowing by the sensor barrel 130. The fluid flow may then be calculated based upon the measured heat flow. In one embodiment, the device 110 calculates the fluid flow based on the measured heat flow according to King's law, as is set out in more detail below.

In one embodiment, the heater 132 and the temperature sensor 134 are separated from the fluid by the sensor barrel 130. That is, the heater 132 and the temperature sensor 134 are not exposed to the fluid. The heater 132 and the temperature sensor 134 contact the sensor barrel 130 and are in thermal communication with the sensor barrel 130. However, the heater 132 and the temperature sensor 134 are not in direct contact with each other. In one embodiment, the heater 132 and the temperature sensor 134 are physically separated from each other and thermally separated from each other by the circuit board 136. It will be appreciated that the sensor barrel 130 is constructed of material that is thermally conductive but is noncorrosive and nonreactive with the fluid used in the system 10. By way of example and not limitation, the sensor barrel 130 may be made of stainless steel, such as, 300 series SS, or another metallic material suitable for direct contact with the fluid. The sensor barrel 130 of stainless steel may be about 0.688 inches long, have a diameter of about 0.245 inches, and be about 0.005 inches thick. Advantageously, it will be appreciated that the flow rate sensor 126 lacks any moving components.

When coupled to the case drain 30 shown in FIG. 1 and as briefly set out above, fluid passing through the fluid path 46 of the device 110 contacts the sensor barrel 130. With reference to FIGS. 11 and 12, the sensor barrel 130 may be positioned to extend approximately ½ or 50% of the diameter of the bore 122, as is best shown in FIG. 12. By way of further example, the sensor barrel 130 may extend into the bore 122 from approximately ⅓ to approximately ⅔ the diameter of the bore 122. In addition, the sensor barrel 130 may be located to one side of or offset from the center line of the bore 122. While a particular location of the sensor barrel 130 is shown and described herein, it will be appreciated that the relative location of the sensor barrel 130 in the bore 122 may depend upon the type of fluid used in the system 10 as well as the relative sizes of the sensor barrel 130 and the bore 122.

With reference now to FIGS. 9, 11, and 12, the heater 132 is shown mounted on the circuit board 136 for electrical communication with a primary circuit board, described below. The heater 132 is configured to heat the sensor barrel 130 to a temperature in excess of the fluid temperature. As shown only in FIG. 12, the flow rate sensor 126 further includes the temperature sensor 134 in thermal communication (e.g., direct contact) with the sensor barrel 130. The temperature sensor 134 is capable of measuring the temperature of the sensor barrel 130 when the sensor barrel 130 is both heated and in the unheated state. In an exemplary embodiment, the temperature sensor 134 is a thermistor, such as a negative temperature coefficient (NTC) thermistor. Suitable thermistors include those commercially available from Cantherm, such as, a 10K thermistor available under part number MF52. In an NTC thermistor, the resistance decreases with increasing temperature.

In one embodiment, and with reference to FIGS. 10 and 11, the device 110 may further include a pressure sensor 140 operatively connected to the manifold 112. In the embodiment shown, the pressure sensor 140 may be secured within the manifold 112. The manifold 112 may thus include a bore 142 that is generally perpendicular to the bore 122, and the pressure sensor 140 may then be disposed within the bore 142. Though the pressure sensor 140 may not extend into the bore 122, that is, it may reside completely within the bore 142, the pressure sensor 140 is exposed to the bore 122 and is thereby capable of measuring the pressure of the fluid within the bore 122. In one embodiment, the pressure sensor 140 is set to measure the pressure about every 5 minutes. As with the pressure sensor 62 disclosed in reference to FIG. 5 described above, the pressure sensor 140 may be a solid-state pressure sensor, such as, a silicone sealed piezoelectric, that is configured to measure the pressure of the fluid in the range of about 0 psi to about 100 psi. In one embodiment, the pressure sensor 140 is a piezoresistive resistive pressure sensor, such as, those available from Sensormate Enterprise Co. Ltd., as identified above. In the exemplary embodiment shown, a seal 144 may be disposed between the pressure sensor 140 and the bore 142 to form a fluid-tight seal therebetween. In addition, a port cap 146 may be disposed between the seal 144 and the pressure sensor 140 to facilitate the fluid-tight seal between the pressure sensor 140 and the manifold 112.

With reference to FIGS. 8 and 9, in one embodiment the device 110 includes at least one fault indicator 70 which may be the same as shown in FIG. 4, for example. The fault indicator 70 may be operatively connected to the flow rate sensor 126 and the pressure sensor 140 and independently operatively connected to the temperature sensor 134. Thus, when one of the signals from any one of the temperature sensor 134, the pressure sensor 140, and the flow rate sensor 126 exceeds a predetermined threshold value for that signal, the device 110 may provide a human perceptible indication via the fault indicator 70 that one of the signals exceeds the predetermined value. In one embodiment, the device includes three fault indicators 70, one for each of the calculated flow rate, the measured temperature, and the measured pressure.

In one embodiment, the housing 114 may be similarly constructed as the housing 36 as shown in FIG. 1. In this regard, the housing 114 may include a lid 150 secured to the housing 114 via screws 90. The lid 150 may be configured to capture a rim 152 with a seal 154 disposed in a U-shaped trough 156 in a downwardly disposed rim 158 of the lid 150. By way of example, the housing 114 may be made from a material similar to the manifold 112, such as, a rigid PVC, the lid 150 may be made of a Plexiglas, such as, those commercially available from Arkema Group.

In one embodiment, the housing 114 contains a circuit board 160 residing on standoffs 162. The circuit board 160 may be in electrical communication with the circuit board 136 of the flow rate sensor 126. Signals from each of the sensors 126, 134, and 140 may be processed by components mounted on the circuit board 160. Circuit board 160 may include a processor (not shown) and a memory (not shown) in which predetermined threshold values for the flow rate, the temperature, and the pressure of the fluid may be stored for comparison to measured values of the temperature and the pressure and the calculated flow rate obtained from the time-dependent temperature measurements. Furthermore, the circuit board 160 may be configured to control the power directed to the heater 132 during the process of measuring the fluid flow rate.

As shown in FIGS. 8 and 9, the pump monitoring device 110 may include the optional power port 102, as set forth above. In addition, as shown best in FIG. 10, the manifold 112 may include an optional blind bore 166 for an additional, optional sensor (not shown). The optional blind bore 166 may include a seal 168.

It will be appreciated that the device 110 may be battery powered or obtain electrical power through other means in which case the port 102 would not be required. It will be further appreciated that the device 110 may include other data ports capable of transmitting any of the flow rate, temperature, and/or pressure signals to a remote location.

During operation of the device 110, it will be appreciated that when the fluid passes through the device 110 it may contact the sensor barrel 130 depending on the position of the sensor barrel 130 relative to the volume of fluid flowing through the device 110. Once in contact for a sufficient time, the sensor barrel 130 will generally be in steady-state temperature uniformity with the fluid. In this condition, the temperature sensor 134 may be used to indirectly measure the fluid temperature by measuring the temperature of the sensor barrel 130.

As set out above in the embodiment described in conjunction with FIGS. 2-7, the measured fluid temperature may be compared to a predetermined threshold temperature for that signal. In one embodiment, temperature measurement may be achieved by measuring the temperature of the sensor barrel 130 over a period of time, for example, over approximately 30 seconds, while the heater 132 is unpowered or off. The signal from the temperature sensor 134 during this period may be used to calculate the fluid temperature. If the calculated temperature is over the predetermined threshold temperature, the fault indicator 70 is activated to indicate a temperature fault. The device 110 may continue to monitor temperature and display the temperature fault until the temperature fault is corrected or power is withdrawn from the device 110.

The flow rate sensor 126 may be used to determine the flow rate of the fluid passing through the device 110.

According to one embodiment, to determine the flow rate, the heat transfer between the fluid and the flow rate sensor 126 may be measured or otherwise quantified. To that end, in one embodiment, the heater 132 is powered to heat the sensor barrel 130 to a predetermined elevated temperature. For example, the elevated temperature may be any temperature that exceeds the fluid temperature. The elevated temperature may depend on the type of fluid and/or type of heater, among other factors. By way of example and not limitation, the elevated temperature may be about 100° F. or greater, and by way of further example, may be range from about 100° F. to about 300° F.

After a predetermined period of time, on the order of a few seconds to less than about 5 minutes (for example, about 2 minutes), to allow for temperature of the sensor barrel 130 to stabilize, and while the heater 132 is powered, the temperature sensor 134 measures the temperature of the sensor barrel 130 over a specific period of time, again on the order of a few seconds to less than about 5 minutes, and outputs at least one signal indicative of the temperature of the sensor barrel 130. During this period, the heater 132 is provided with precisely as much electrical energy as needed to compensate for the heat dissipation from the sensor barrel 130 to the flowing fluid to maintain the sensor barrel 130 at a substantially constant temperature. The calculation of the flow rate may then be based on the power consumed by the heater 132 due to heat dissipation into the fluid over the specified period of time. The power supplied to the heater 132 is specific and readily known and controlled. By way of example only, and not limitation, a MOSFET may be used to provide power to the heater 132, and further, pulse-width modulation (PWM) may be a technique used to control the power to the heater 132. An algorithm may then be used to calculate the fluid flow rate based on all or a portion of the time-dependent energy consumption. The calculation may include a previously or subsequently measured fluid temperature so that the calculated flow rate is based on the original fluid temperature and the heated temperature. If the calculated flow rate is over the predetermined threshold flow rate, the fault indicator 70 is activated to indicate the flow rate fault. The device 110 may continue to monitor flow rate and display the flow rate fault until the flow rate fault is corrected or power is withdrawn from the unit.

Without being bound by theory, the higher the fluid flow, i.e., the mass flow, past the sensor barrel 130, while it is being heated, the more electrical power is consumed by the heater 132 to maintain the sensor barrel 130 at the targeted elevated temperature. In this regard, the power output to the heater 132 may be a measure of the mass flow of the fluid past the sensor barrel 130, for example, according to King's law, in which the rate of heat loss to the fluid is related to the electrical power delivered to the heater 132. By way of example only, it is believed that fluid flow rate or fluid velocity is a function of input current flow and fluid temperature according to the equation $$a + b \cdot v_f^c = \frac{I^2 R_w}{A_w(T_w - T_f)}$$

where $v_f$ is the calculated fluid velocity, l is the current input, $R_w$ is heater resistance, $A_w$ is the heater surface area, $T_w$ is the heater temperature, $T_f$ is the fluid temperature, and a, b, and c are constants obtained from calibration. It will be appreciated that the fluid temperature may be measured such that the fluid velocity is directly related to the input current only.

Alternatively, the heater 132 is powered to heat the sensor barrel 130 to a predetermined elevated temperature, as set out above. However, rather than measure the power supplied to the heater 132, the time dependent temperature of the sensor barrel 130 is measured for a constant power. The temperature fluctuation of the sensor barrel 130 is related to the fluid flow rate. An algorithm may then be used to calculate the fluid flow rate based on all or a portion of the time-dependent temperature fluctuation. If the calculated flow rate is over the predetermined threshold flow rate, the fault indicator 70 is activated to indicate the flow rate fault.

In one embodiment, the temperature sensor 134 may be used to measure a time-dependent drop or a time-dependent raise in temperature of the sensor barrel 130. For a time-dependent drop in temperature, after the sensor barrel 130 is heated to a predetermined temperature, the power to the heater 132 is turned off. Once the power to the heater 132 is removed, the drop in temperature of the sensor barrel 130 is measured as a function of time. For a time-dependent raise in temperature, the time it takes for the sensor barrel 130 to reach a temperature for a given power output may be measured. In either case, the change in the temperature of the sensor barrel 130 is related to both the mass flow of the fluid by the sensor barrel 130 and the temperature difference between the sensor barrel 130 and the fluid temperature.

In either respect, heat flow dissipated to the fluid flowing past the sensor barrel 130 may be measured and the flow rate of the fluid may be calculated by an algorithm. If the calculated flow rate exceeds a predetermined threshold value, a human perceptible indication that the flow rate exceeds the threshold flow rate may be activated. It will be appreciated that the sensitivity of the flow rate sensor 126 changes with the fluid velocity, fluid type, and fluid temperature. In this regard, the sensitivity may increase with decreasing fluid velocity and lower fluid temperatures.

Figure 13:
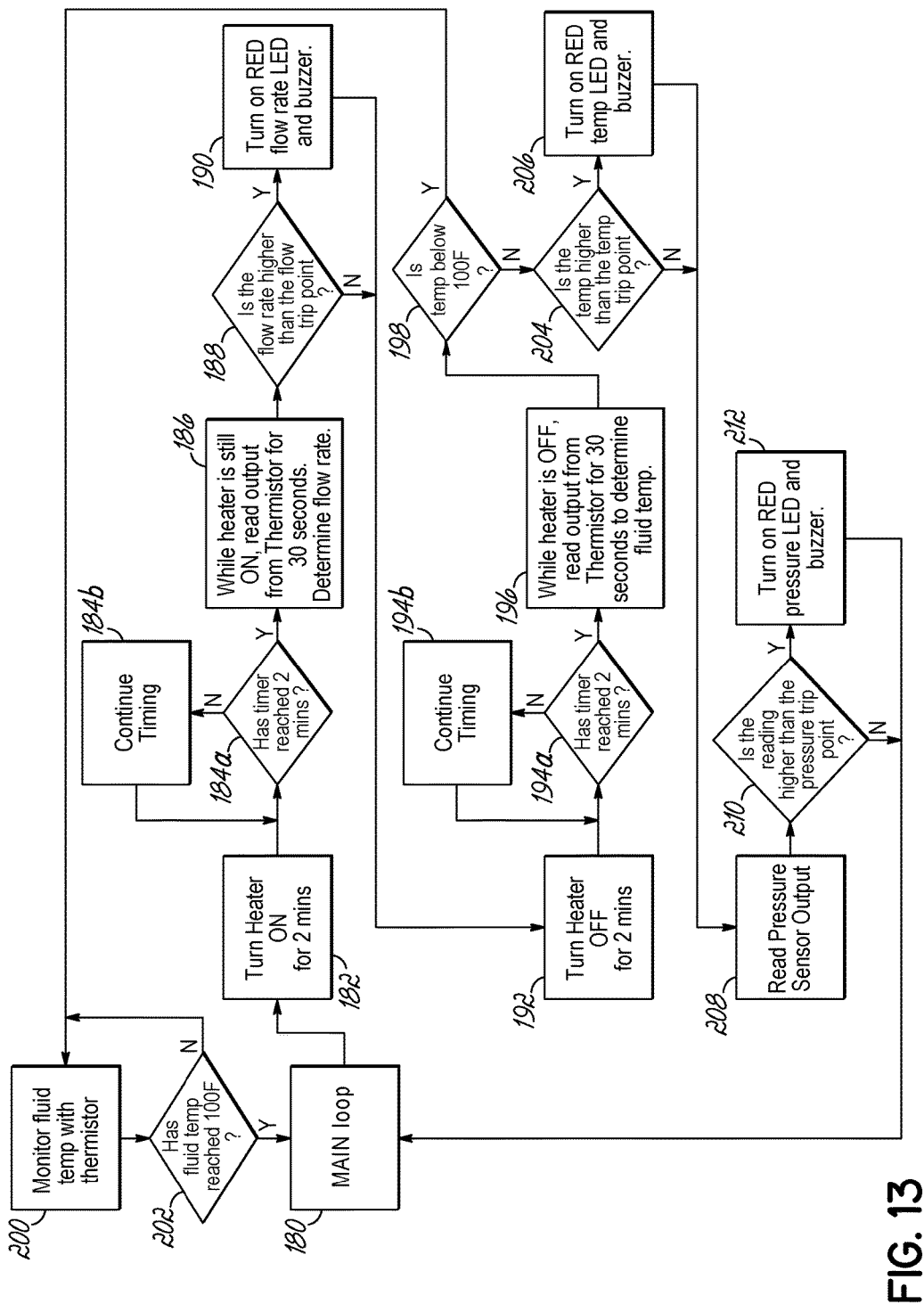
FIG. 13 is a flowchart of an exemplary process for measuring temperature, flow rate, and pressure of a fluid according to one embodiment of the invention.

With reference to FIG. 13, an exemplary flowchart for measuring one or more of the temperature, flow rate, and pressure of the fluid passing through the device 110 is shown. The "MAIN loop" begins at 180. To measure the fluid flow rate, at 182, the heater 132 is switched "ON" for two minutes. Once the heater 132 has been on or powered with the specified amount of power for two minutes, as is represented by the combination of 184a and 184b, at 186, the signal from the temperature sensor 134 (represented by "Thermistor") is read for 30 seconds while the heater 132 is ON. The fluid flow rate is then determined or calculated as set out above. At 188, the fluid flow rate is compared to the predetermined threshold value or "the flow trip point" and, if the measured flow rate is greater than the flow trip point, the fault indicator 70, as represented by a "red flow LED and buzzer" in 190 is turned ON to provide human perceptible indications of the flow rate fault condition. If the measured flow rate is not higher than the flow trip point, then the heater 132 is turned OFF for two minutes according to 192. After two minutes, as represented by 194a and 194b, while the heater 132 is OFF, the signal from the Thermistor is read at 196 for 30 seconds to determine the fluid temperature. At 198, the determined fluid temperature is compared to 100° F. If the measured temperature is below 100° F., the temperature of the fluid is monitored at 200 and, at 202. The fluid temperature is continuously monitored until it reaches 100° F. Upon reaching a fluid temperature of 100° F., the process of measuring the fluid flow rate begins again at 180.

Returning to 198, if the fluid temperature is above 100° F., at 204, the fluid temperature is compared to the predetermined threshold fluid temperature or "temp trip point." If the measured temperature is above the temp trip point or predetermined threshold fluid temperature, the fault indicator 70, as represented by the "red temp LED and buzzer" in 206 is turned ON to provide human perceptible indications of the temperature fault condition.

At 204, if the measured temperature is lower than the temp trip point, then the pressure sensor 140 is monitored at 208 to determine whether a pressure fault condition exists. In this regard, at 210, the measured pressure is compared to the predetermined threshold fluid pressure. If the measured pressure is higher than the pressure trip point or predetermined threshold fluid pressure, the fault indicator 70, as represented by "red pressure LED and buzzer" in 212 is turned ON. If, however, at 210, the measured pressure is below the pressure trip point, the process begins again at the MAIN loop at 180.

Figure 14:
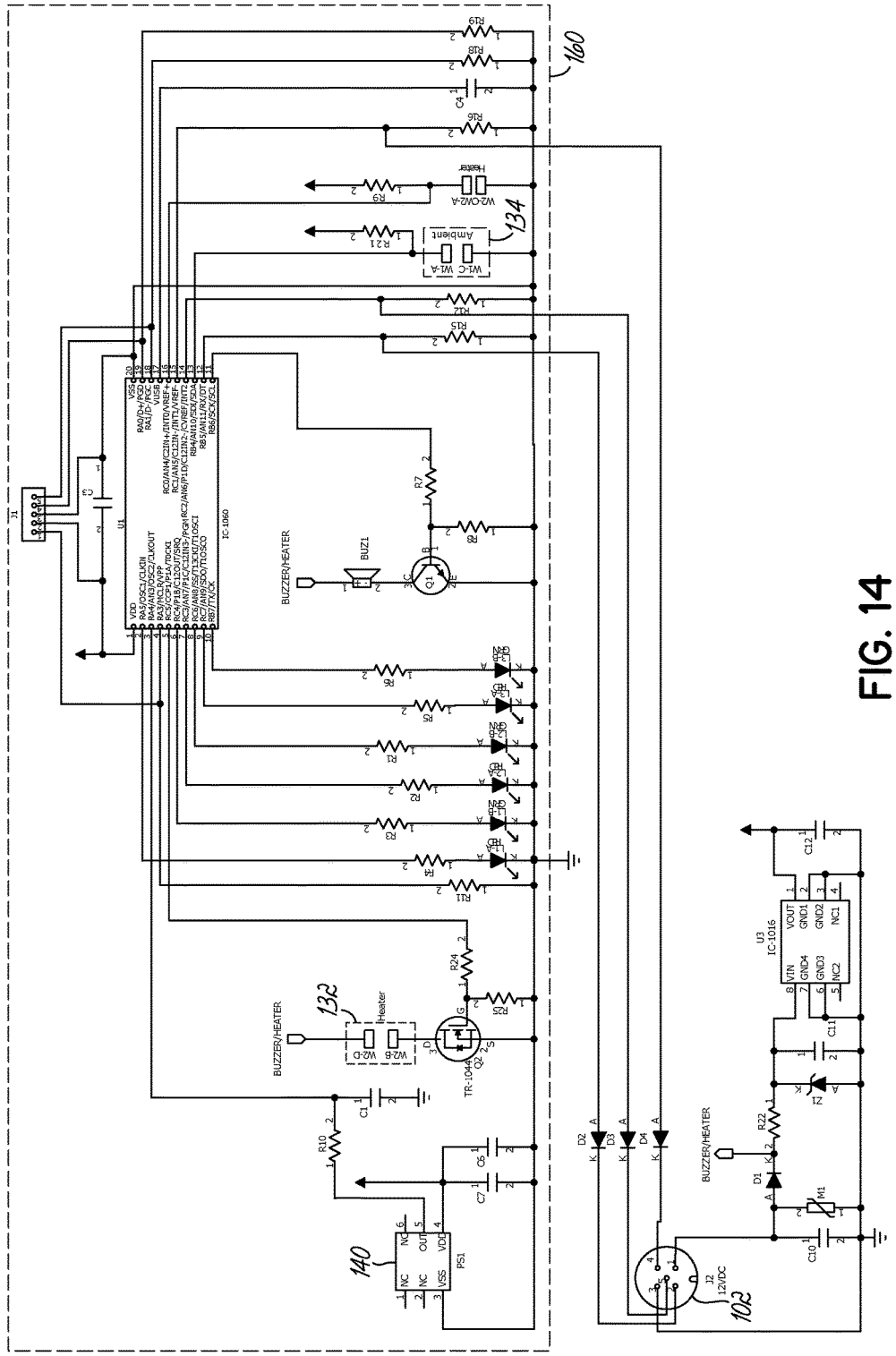
FIG. 14 is an exemplary electrical schematic for one embodiment depicting a circuit board, a heater, and a temperature sensor.

With reference now to FIG. 14, an exemplary electrical schematic is shown illustrating components of the circuit board 160 and their connection to the heater 132 and the temperature sensor 134.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details and representative devices shown and described. Accordingly, departures may be made from such details without departing from the scope of the general inventive concept.

What is claimed is:

1. A pump monitoring device configured to be fluidly coupled to a case drain of a pump, the device comprising:
    a manifold including an inlet configured for fluid connection to the case drain, an outlet and a fluid path extending between the inlet and the outlet;
    at least one connector provided at the inlet or outlet of the manifold;
    a flow rate sensor operatively connected to the manifold and configured to generate a signal indicative of a flow rate of a fluid flowing in the fluid path from the inlet to the outlet;
    a temperature sensor operatively connected to the manifold and configured to generate a signal indicative of a temperature of the fluid flowing in the flow path from the inlet to the outlet; and
    a pressure sensor operatively connected to the manifold and configured to generate a signal indicative of a pressure of the fluid flowing in the flow path from the inlet to the outlet.

2. The device of claim 1, wherein the flow rate sensor is a rotatable paddle wheel including a plurality of paddles in fluid communication with the fluid path.

3. The device of claim 1, further comprising:
    a housing supported by the manifold and defining a flow sensor chamber in fluid communication with the fluid path.

4. The device of claim 3, wherein the manifold defines a flow sensor chamber.

5. The device of claim 4, wherein the flow sensor chamber of the housing is sealed with the flow sensor chamber of the manifold.

6. The device of claim 5, wherein the flow rate sensor is rotatably disposed in the flow sensor chamber of the housing and in the flow sensor chamber of the manifold.

7. A pump monitoring device configured to be fluidly coupled to a case drain of a pump, the device comprising:
    a manifold including an inlet configured for fluid connection to the case drain, an outlet and a fluid path extending between the inlet and the outlet;
    at least one connector provided at the inlet or outlet of the manifold;
    a housing supported by the manifold, each of the housing and the manifold defining a flow sensor chamber in fluid communication with the fluid path;
    a rotatable paddle wheel operatively disposed in the flow sensor chambers defined by the housing and the manifold and including a plurality of paddles in fluid communication with the fluid path and configured to generate a signal indicative of a flow rate of a fluid flowing in the fluid path from the inlet to the outlet;
    a temperature sensor operatively connected to the manifold and configured to generate a signal indicative of a temperature of the fluid flowing in the flow path from the inlet to the outlet; and
    a pressure sensor operatively connected to the manifold and configured to generate a signal indicative of a pressure of the fluid flowing in the flow path from the inlet to the outlet.

8. The device of claim 7, wherein the temperature sensor and the pressure sensor are located in the manifold downstream of the rotatable paddle wheel.

9. A pump monitoring device configured to be fluidly coupled to a case drain of a pump, the device comprising:
    a manifold including an inlet configured for fluid connection to the case drain, an outlet and a fluid path extending between the inlet and the outlet;
    at least one connector provided at the inlet or outlet of the manifold; and
    a flow rate sensor including a temperature sensor, a heater, and a sensor barrel, the sensor barrel being disposed in the fluid path, the heater and the temperature sensor being in thermal communication with the sensor barrel, the heater being configured to heat the sensor barrel and the temperature sensor being configured to generate at least one signal indicative of a temperature of the sensor barrel and also being configured to generate a signal indicative of a temperature of the fluid flowing in the fluid path when the sensor barrel is not being heated by the heater.

10. The device of claim 9, wherein each of the temperature sensor and the heater is contained within the sensor barrel so that the sensor barrel separates the temperature sensor and the heater from contact with the fluid flow.

11. The device of claim 10, further comprising:
    a pressure sensor operatively connected to the manifold and configured to generate a signal indicative of a pressure of the fluid flowing in the fluid path from the inlet to the outlet.

12. The device of claim 10, wherein the device is configured to supply electrical power to the heater to raise the temperature of the sensor barrel to a temperature that exceeds the temperature of fluid flowing through the fluid path and is configured to measure the power required to maintain the sensor barrel at that temperature.

13. The device of claim 10, wherein the signal indicative of the flow rate of the fluid flowing in the fluid path includes a plurality of signals indicative of a temperature over a predetermined period of time.

14. The device of claim 10, wherein the flow rate sensor includes a negative temperature coefficient piezoresistive thermistor.

* * * * *